Oct. 26, 1943.   W. LEATHERS   2,333,018
VERTICAL AXIS CANISTER-TYPE VACUUM-CLEANER
Original Filed Oct. 12, 1939
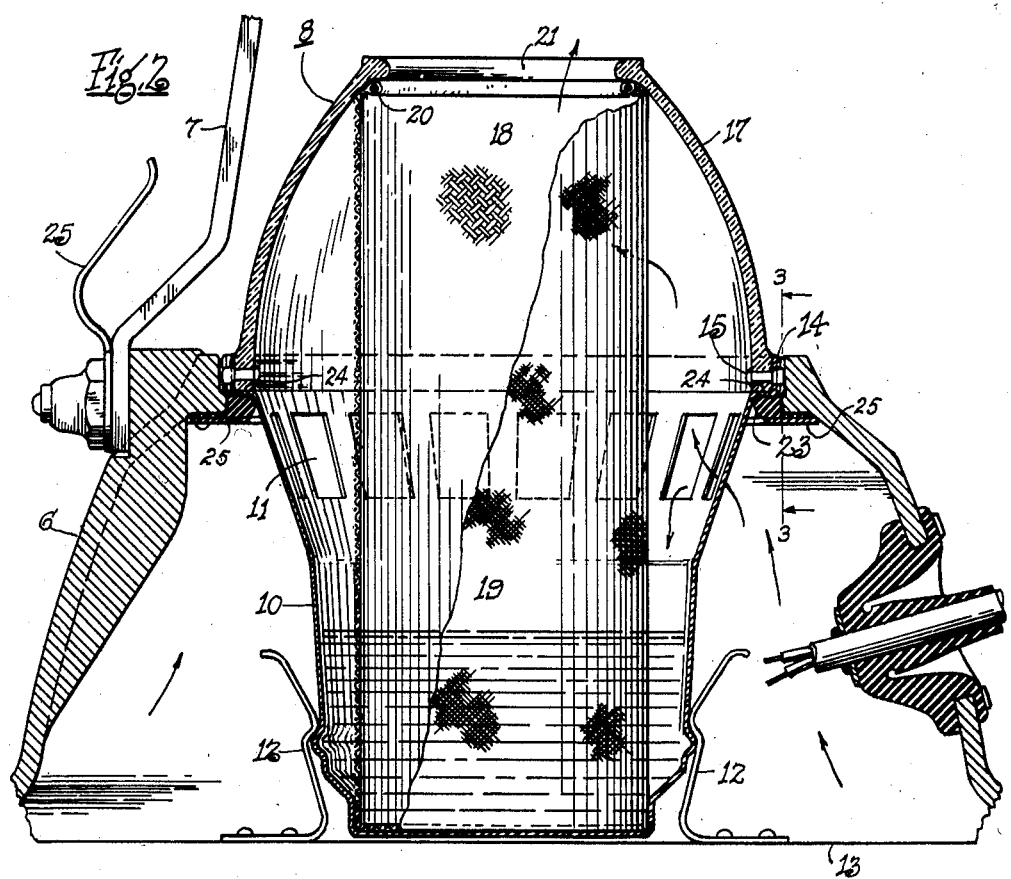
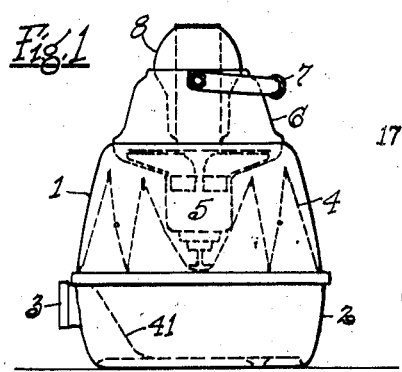
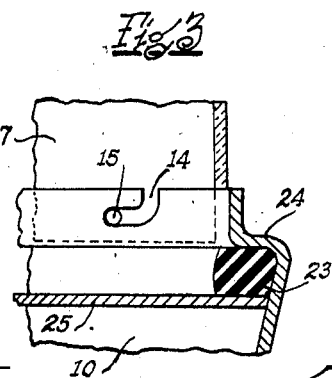
INVENTOR.
Ward Leathers Patented Oct. 26, 1943

2,333,018

UNITED STATES PATENT OFFICE 2,333,018

VERTICAL-AXIS CANISTER-TYPE VACUUM CLEANER

Ward Leathers, Brooklyn, N. Y., assignor to Quadrex Corporation, New York, N. Y., a corporation of Delaware Substituted for abandoned application Serial No. 299,130, October 12, 1939. This application December 18, 1941, Serial No. 423,841

4 Claims. (Cl. 183—9)

The present invention relates to portable hose type vacuum-cleaners and more particularly to a secondary filter unit designed for use in connection with such vacuum-cleaners.

This application is a substitute application for my previously filed application, Serial No. 299,130, filed October 12, 1939, for Vertical-axis canister-type vacuum-cleaner.

The principal object of the present invention is to provide a secondary filter unit designed for use in connection with vertical-axis hose type vacuum-cleaners and adapted to be inserted in the upper outlet opening of the main vacuum cleaner housing whereby air passing therethrough, having once been filtered in the main body of the housing, is again filtered for the removal of such finer particles of dirt as may have passed through the interstices of the main filter unit.

A further object of the invention is to provide a secondary filter unit of the character set forth above which will operate to wash the air passing therethrough, thus rendering the exhaust from the vacuum-cleaner less impure than where a dry dirt separation process is employed.

A still further object of the invention is to provide an auxiliary filter unit for vacuum-cleaners of the type set forth above which is extremely effective for the purposes intended, yet which will provide for ease of assembly and disassembly for cleaning purposes.

Yet another object of the invention is to provide such a secondary filter unit which may be readily inserted into and removed from the exhaust opening of the main vacuum-cleaner housing, yet which, once it has been placed in position within the opening, is securely held therein against dislodgment.

Another object of the invention is to provide a secondary filter unit of this character which when in position in the outlet opening of the vacuum-cleaner affords visible means whereby the condition of the filter may be ascertained without removing the same from the vacuum-cleaner housing.

Another object of the invention is to provide a secondary filter unit which is manually insertable into the outlet opening of the vacuum-cleaner housing and which upon insertion therein becomes automatically locked in position against dislodgment, while at the same time an effective seal is created between the secondary filter unit and the opening in which it is disposed.

Other objects and advantages of the invention not at this time enumerated will become more readily apparent hereinafter.

In order to make clear what I have invented, and to describe it so all may understand it, I have prepared the following specification, to which a drawing is appended. In the drawing—

Fig. 1 is a side elevational view of a vacuum-cleaner constructed in accordance with the principles of the present invention.

Fig. 2 is a fragmentary enlarged detailed sectional view taken substantially centrally through the upper portion of the vacuum-cleaner shown in Fig. 1 and illustrating the details of the improved secondary filter unit comprising the present invention, and Fig. 3 is a sectional view taken substantially along the line 3—3 of Fig. 2.

In Figure 1, a main shell 1 is disposed immediately above a dirt-receptacle 2 which has a connection 3 for the cleaning hose. Within the main shell 1 is a filtering mechanism 4 and a motor-suction-unit 5. Above the shell 1 is a housing 6 which supports a bail-handle 7 and from the top of which projects a secondary-filter-unit, generally characterized by the numeral 8.

The secondary-filter-unit comprises a lower cup-like portion 10 having circumferential ports 11 near the top. The cup-like portion 10 is provided with a horizontal ledge portion 24 adjacent its rim. This ledge portion is designed for sealing engagement with a ring-like rubber gasket 23 which is seated upon an internal ledge 25 disposed immediately beneath the rim of the housing 6. This cup-like portion is held downward in the machine by springs 12 joined to a perforated diaphragm 15 which extends horizontally across the upper portion of the housing 6 a slight distance below the rim thereof. The top of the cup portion 10 is provided with bayonet slots 14 into which bayonet pins 15 engage. The pins 15 are mounted at the rim of the top shell 17 which is made of transparent material such as cellulose acetate or methyl methacrylate. Any other suitable means may be used for separably joining the cup portion 10 to the shell 17. Between the lower portion 10 and the upper shell 17 is disposed a perforated cylinder 18, preferably of non-ferrous wire mesh. This cylinder is surrounded by a fabric bag 19 drawn together at the top over the upper edge or rim of the cylinder 8 in suitable manner as by a draw string 20. The portion 10 and the top shell 17, together with the screen cylinder 18 and the fabric bag 19, form a manually removable unit which is, in function, a secondary liquid-type filter. This unit is removable from the machine by placing the fingers inside the opening 21 at the top and pulling it out of the top of the cleaner. When it is replaced it rests on the rubber gasket 23 and when pressed downward is caught underneath the springs 12. The springs 12 exert a downward pulling effect upon the entire unit, thus causing the horizontal ledge portion 24 of the cup portion 10 to be forced downwardly in sealing relationship with the rubber gasket 23. The operation or use of this secondary filter is as follows: The operator places the cylinder 18 in the bag 19 and catches the combined screen and bag between the top and bottom shells by means of the bayonet slots 14 and pins 15 as indicated. Before or after placing this filter-unit in the top of the machine, a relatively small quantity of liquid, such as water, or water and other desirable elements, such as alcohol, volatilizable disinfectants, perfumes, and the like are poured into the top of the unit through the opening 21. It should be noted that it is perfectly practical to pour the liquid into this filter-unit while the filter-unit is in the top of the machine for the liquid must be guided by the fabric bag 19 to the bottom of the cup 10 from which it is comparatively difficult to spill any through the ports 11. The bag 19 acts as a wick drawing the liquid upward throughout its entire length by capillary attraction. Air from the motor-suction-unit 5 passes upward through the machine as indicated by the arrows through the ports 11 into the filter-unit, on through the liquid-soaked bag 19, to where it is exhausted through the opening 21. When the bag has accumulated a sufficient amount of dirt, which is evident to the operator through the transparent shell 17, the unit may be removed from the machine, instantly separated by means of the bayonet slots, and washed.

A cord hook 25 provides means of holding the cord on the machine.

I have thus set forth my invention in clear terms and described specifically one embodiment thereof, but at the same time wish it understood that many variations may be made on the preferred form shown and described without departing from the spirit of my invention.

What I claim is:

1. A secondary filter unit designed for reception within the outlet opening of a vertical-axis vacuum-cleaner in an upright position, said filter comprising a lower cup-shaped shell having an imperforate bottom and side walls which are imperforate throughout their lower regions thus forming a receptacle adapted to receive a liquid therein, a closure for the upper end of said shell removably secured thereto, a tabular filter screen disposed within said unit and positioned between the closure and shell and extending downwardly in the shell to a point adjacent said bottom, there being air passages extending through the upper regions of said shell, said closure being provided with an air outlet opening, said opening being wholly disposed within the tubular confines of said filter screen.

2. In a portable hose-type vertical-axis vacuum cleaner, a main housing having an air inlet adjacent its bottom and an air outlet adjacent its top, a secondary filter unit removably disposed in said outlet opening, a horizontal perforate partition extending across said housing below said outlet opening, said secondary filter unit comprising a cup-shaped shell having an imperforate bottom and side walls which are imperforate throughout their lower regions thus forming a receptacle adapted to receive a small quantity of liquid therein, an annular horizontal sealing flange formed on said shell adjacent its upper edge, an inwardly directed horizontal ledge projecting inwardly from said housing below said outlet opening, a sealing medium on said ledge and disposed between said horizontal flange and ledge in sealing engagement therewith, a dome-like closure for said shell removably secured to the shell in a rim-to-rim engagement therewith, said closure being formed with an outlet opening centrally thereof, a removable filter screen disposed within said unit, said filter screen comprising a cylindrical open-ended perforate member and a cloth bag surrounding the same, said screen bearing at its upper and against said closure and resting at its lower end upon said imperforate bottom, an outwardly projecting annular bead formed on said shell adjacent its bottom and a plurality of spring fingers secured to said horizontal partition and bearing against said bead for removably holding said filter unit in position within said outlet opening and for normally urging the same downwardly in the opening.

3. In a portable hose-type vertical-axis vacuum-cleaner, a main housing having an air inlet adjacent its bottom and an air outlet adjacent its top, a secondary filter unit removably disposed in said outlet opening, said filter unit comprising a cup-shaped shell having an imperforate bottom and side walls which are imperforate throughout their lower regions thus forming a receptacle adapted to receive a small quantity of liquid therein, an annular horizontal flange formed on said shell adjacent its upper edge, an inwardly directed horizontal ledge projecting inwardly from said housing below said outlet opening, a sealing medium on said ledge disposed between said horizontal flange and ledge in sealing engagement therewith, a closure for said shell removably secured to the upper edge thereof, said closure being formed with an outlet opening centrally thereof, a removable filter screen disposed within said unit and surrounding said latter opening and means carried by said housing and bearing against said shell for normally urging the filter unit downwardly in the housing to cause said horizontal sealing flange and ledge to compress said sealing medium therebetween.

4. In a portable hose-type vertical-axis vacuum-cleaner, a main housing having an air inlet adjacent its bottom and an air outlet adjacent its top, a secondary filter unit removably disposed in said outlet opening and projecting partially thereinto, said filter unit comprising a cup-shaped shell having an imperforate bottom and side walls which are in imperforate throughout a major portion of their lower regions thus forming a receptacle adapted to receive a small quantity of liquid therein, an annular horizontal flange formed on said shell adjacent its upper edge, an inwardly directed horizontal ledge extending from said housing in the vicinity of said outlet opening, a sealing medium disposed between said ledge and horizontal flange, a closure for said shell removably secured to the upper edge thereof, said closure being formed with an outlet opening and being positioned substantially exteriorally of the main housing, a removable filter screen disposed within said unit and surrounding said latter opening, and spring means carried by said housing for retaining said cup-shaped shell within the housing.

WARD LEATHERS.